United States Patent [19]

Schmitkons et al.

[11] Patent Number: 5,372,283
[45] Date of Patent: Dec. 13, 1994

[54] TWO-COMPONENT DISPENSING SYSTEM

[75] Inventors: James W. Schmitkons, Lorain; Jan Shanaberger, Westlake; Jeffrey S. Noss, Bay Village, all of Ohio

[73] Assignee: Nordson Corporation, Westlake, Ohio

[21] Appl. No.: 148,895

[22] Filed: Nov. 8, 1993

Related U.S. Application Data

[63] Continuation of Ser. No. 852,820, Mar. 17, 1992, abandoned.

[51] Int. Cl.$^5$ ............................................. B67D 5/60
[52] U.S. Cl. .................................. 222/145; 222/148; 222/571; 222/495; 366/167
[58] Field of Search ................. 222/129, 133, 135–145, 222/148, 494–497, 501, 504, 505; 366/160, 167

[56] References Cited

U.S. PATENT DOCUMENTS

| | | | |
|---|---|---|---|
| 136,095 | 2/1873 | Reiner | 222/559 |
| 1,505,602 | 8/1924 | Podolsky | 222/559 |
| 2,527,689 | 10/1950 | Suthard . | |
| 2,779,506 | 1/1957 | Gajda et al. | 222/571 |
| 3,315,899 | 4/1967 | Quarve . | |
| 3,487,508 | 3/1970 | Francisoud | 222/571 |
| 3,490,658 | 1/1970 | Schwartzman | 222/496 X |
| 3,687,582 | 8/1972 | Hendry . | |
| 3,895,748 | 7/1975 | Klingenberg . | |
| 3,999,691 | 12/1976 | Doom . | |
| 4,004,717 | 1/1977 | Wanke . | |
| 4,014,463 | 3/1977 | Hermann | 222/145 |
| 4,053,012 | 10/1977 | Farmer . | |
| 4,114,195 | 9/1978 | Dirksing et al. | 366/167 |
| 4,142,707 | 3/1979 | Bjorklund . | |
| 4,255,125 | 3/1981 | Auclair . | |
| 4,350,803 | 9/1982 | Penn . | |
| 4,394,945 | 7/1983 | Taylor, Jr. | 222/571 |
| 4,523,696 | 6/1985 | Commette et al. | 222/145 X |
| 4,549,813 | 10/1985 | Volz et al. | 366/167 X |
| 4,660,598 | 4/1987 | Butterfield et al. . | |
| 4,846,379 | 7/1989 | Warburton et al. | 222/495 X |
| 4,852,773 | 8/1989 | Standlick et al. . | |
| 4,901,888 | 2/1990 | Standlick . | |
| 4,991,529 | 2/1991 | McKune . | |
| 5,005,765 | 4/1991 | Kistner . | |
| 5,052,591 | 10/1991 | Dirall et al. | 222/571 X |
| 5,065,910 | 11/1991 | Fiedler . | |
| 5,066,137 | 11/1991 | King . | |
| 5,092,492 | 3/1992 | Centea . | |
| 5,131,570 | 7/1992 | Sawyer, III | 222/559 X |
| 5,193,593 | 3/1983 | Denis et al. | 222/571 X |

FOREIGN PATENT DOCUMENTS

| | | |
|---|---|---|
| 682718 | 12/1966 | Belgium . |
| 1217745 | 2/1987 | Canada . |
| 0137250 | 8/1984 | European Pat. Off. . |
| 2074037 | 10/1971 | France . |
| 57026 | 11/1945 | Netherlands . |
| 1581536 | 12/1980 | United Kingdom . |

OTHER PUBLICATIONS

"Twinmixer II Dispense Valve", publication of Liquid Control Corp., North Canton, Ohio.
"Posiload".
"Twinflow Mini II", Technical Data Sheet of Liquid Control Corp., North Canton, Ohio, May 1987.
"Motionless Tube Mixing Assembly With Over–Under Block", Form No. PS–101, of Liquid Control Corp., North Canton, Ohio, 12–82.
"Oil-Rite Injector Pump System Featuring PurgeX, Style DG", Oil-Rite Corporation, Manitowoc, Wisconsin, 1989.

Primary Examiner—Andres Kashnikow
Assistant Examiner—Kenneth DeRosa
Attorney, Agent, or Firm—Wood, Herron & Evans

[57] ABSTRACT

Apparatus for dispensing a mixture of two components comprises a dispenser device formed with a first passageway connected to a source of a Component A material, and a second passageway connected to a source of a Component B material, both of which are connected to a static mixer where the components are combined to form a mixture. The dispenser includes structure for purging the mixture of Component A and B from areas of the dispenser which come into contact therewith, and a check valve operative to create a suction within the dispenser and static mixer to prevent leakage of the mixture from the static mixer when flow of the components is interrupted.

21 Claims, 3 Drawing Sheets

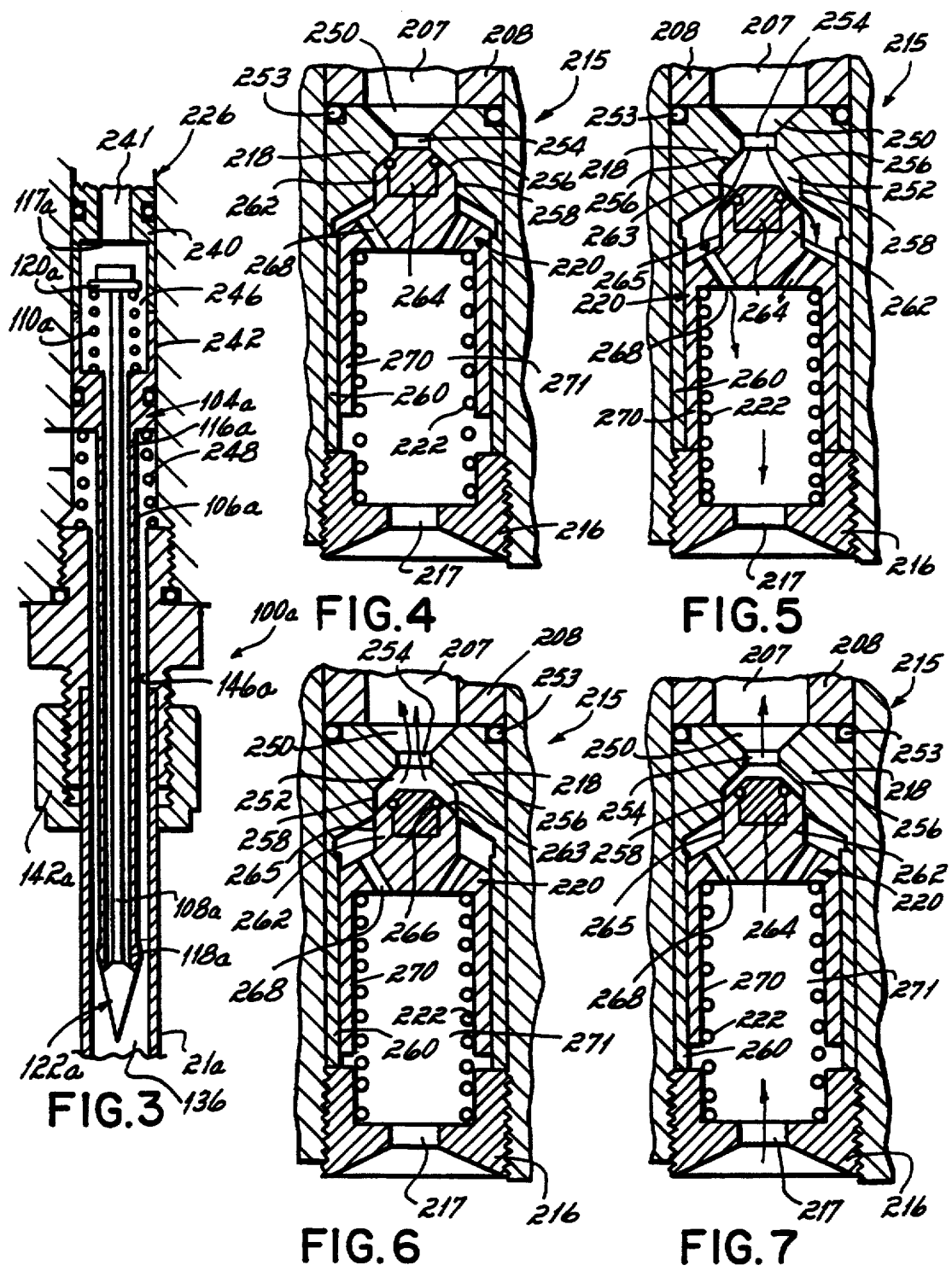

TWO-COMPONENT DISPENSING SYSTEM

This application is a continuation of application Ser. No. 07/852,820, filed Mar. 17, 1992, now abandoned.

RELATED INVENTIONS

This invention is related to U.S. patent application Ser. No. 07/640,043, filed Jan. 11, 1991, entitled "Method and Apparatus for Cleaning a Mixer" which is owned by the assignee of this invention, and the disclosure of which is hereby incorporated herein by reference in its entirety.

FIELD OF THE INVENTION

This invention relates to dispensing systems, and, more particularly, to a method and apparatus for dispensing two-component materials, such as for example, polymeric materials.

BACKGROUND OF THE INVENTION

Two-component polymeric materials such as reactive adhesives, paints, gasket materials and caulking materials comprise two separate components which react chemically with one another when intermixed. For example, two-component hot melt polymeric materials used in adhesive applications include a high volume polymeric material and a lower volume polymeric material such as a hardener. These types of hot melt adhesives, and other two-component polymeric materials, are dispensed from a system in which the two components are supplied from separate sources in a predetermined ratio to a dispensing device which then discharges the components into a mixer where the components are intermixed with one another before being emitted onto a substrate.

One problem with two-component dispensing systems of this type is that the two materials forming the two-component mixture begin to cure as soon as they come into contact with one another, and tend to collect on surfaces of both the dispenser and mixer, particularly when such components are dispensed intermittently. These cured materials can plug or at least constrict the flow of materials through the dispenser and mixer much like arteriosclerosis causes problems with constricting the flow of blood through the arteries and heart.

The problem of constriction of the flow paths through two-component dispensing systems has been addressed in U.S. patent application Ser. No. 07/640,043, mentioned above, in which a purging operation is performed to remove cured material from the system. In the practice of the method disclosed in Ser. No. 07/640,043, the supply of one of the two components to the dispenser and mixer is shut off, while the flow of the other component into the mixer portion of the system is permitted to continue. If hot melt polymeric materials are being dispensed through the system, for example, the high volume polymeric material may be used as the flushing material to perform the purging operation while the flow of the low volume polymeric material such as a liquid hardener is discontinued. The method disclosed in the Ser. No. 07/640,043 application has proven effective to purge the cured or partially cured mixture of the two components from the mixer portion of the system, but problems remain with removing the cured mixture from those portions of the dispenser where the two components come into contact with one another. Without an effective means for preventing or slowing the formation, and/or for removing such cured material from the dispenser, restrictions or clogs of the cured material can develop which eventually constrict and/or plug the passageways within the dispenser which emit the two components into the mixer.

Another aspect of two-component mixing and dispensing systems, particularly when operated intermittently, involves obtaining a clean, sharp cut off of the flow of the mixture emitted from the discharge outlet of the mixer portion of the system. In two-component dispensing systems of the type described above, valves are provided to control the supply of each component to the dispenser device, which then discharges the materials to the mixer. These valves may be located at the inlets to the dispensing device, which are remote from the discharge outlet of the mixer. This may result in the mixture leaking out of the mixer before the valves are reopened to resume the dispensing operation.

SUMMARY OF THE INVENTION

It is therefore among the objectives of this invention to provide a method and apparatus for dispensing two-component mixtures of material, such as for example two-component mixtures of polymeric material, which provides for improved purging of the mixture therefrom.

It is another object of the invention to provide an apparatus for reducing and/or preventing the build up of restrictions or clogs within the apparatus.

It is still another object of the invention to provide an apparatus which substantially prevents leaking or drooling from the discharge outlet of a dispenser, particularly when the system is operated intermittently.

These objectives are accomplished in an apparatus for dispensing a mixture of two components of polymeric material which comprises a dispenser device and a mixer, such as for example a static mixer of the type having an internal mixing element which repeatedly divides and recombines the mixture in the course of passage therethrough. The dispenser is formed with a first passageway connected to a source of a Component A polymeric material, and a second passageway which is connected to a source of a Component B polymeric material. The Component A and B materials are initially combined at the discharge outlets of the first and second passageways, and then fed into the static mixer to form a mixture which is emitted from the discharge outlet of the static mixer. In one embodiment, the dispenser device is operative to supply the Component A and B materials to the static mixer for essentially any duration required in a particular application. In an alternative embodiment, the dispenser device is provided with a piston pump which supplies the A and B component materials in intermittent shots or doses to the static mixer.

One aspect of each embodiment of this invention is predicated upon the concept of purging cured and/or partially cured mixture from the surfaces of the dispenser in the area where the two components are initially combined. In order to perform a purging operation, the flow of the lesser volume component, e.g., Component A, is temporarily terminated while the passage of the high volume component, Component B, is permitted to continue moving through the second passageway in the dispenser. A check valve is carried within the first passageway of the dispenser to control the flow of Component A therethrough. This check valve has a valve seat located at the outlet to the first passageway carrying the Component A, and a plunger with a plunger tip movable with respect to the valve seat. With the plunger tip in a closed position against the valve seat, i.e., during a purging operation, the Component B material, or alternatively a purging material, such as for example a solvent, is emitted from the second passageway within the dispenser along a flow path which directs the Component B material past the discharge end of the check valve and over its plunger tip. The plunger tip is preferably formed in the shape of an inverted cone, or, alternatively, in the shape of a ball, so as to permit the Component B material to flow smoothly therepast, to help prevent the accumulation of cured or partially cured mixture, and remove any cured or partially cured mixture which may be present on the valve tip and/or the valve seat portion of the check valve. This smoothly tapered surface of the plunger tip also substantially prevents the formation of eddies, dead spots, voids or other interference with the smooth flow of the Component B material from the second passageway of the dispenser into the mixer during a purging operation so that substantially all of the cured or partially cured mixture at the discharge end of the dispenser can be removed during a purging operation.

Another aspect of this invention is predicated upon the concept of preventing leakage or drooling of material from the discharge outlet of the dispenser when flow of material through the dispenser is intermittently terminated. In one embodiment, this is accomplished by providing a "suck-back" check valve within the second passageway in the dispenser device which carries the high volume, Component B material. This suck-back check valve includes a valve seat having a tapered bearing surface, and a valve plug formed with an extension which mates with the bearing surface of the valve seat and which carries an o-ring seal. The valve plug is continuously biased toward the valve seat by a return spring, which is also carried within the second passageway.

In response to the introduction of Component B material into the second passageway, the valve plug is forced away from the bearing surface of the valve seat allowing such material to pass through the second passageway and into the static mixer for combination with the Component A material. When the flow of Component B material is intermittently interrupted, the return spring biases the valve plug toward the valve seat, but the valve plug is prevented from immediately seating due to the presence of Component B material within the valve seat and in passages upstream therefrom. After a brief period, the pressure within the second passageway, upstream from the valve seat, is at least partially relieved to allow the valve plug to force the Component B material out of the valve seat and then return to its closed position with respect to the valve seat. In the course of moving toward this closed position, the valve plug creates a suction within the passageways downstream therefrom which prevents the mixture of Component A and B materials within the static mixer from escaping until such time as the flow of Component A and B materials is resumed.

DESCRIPTION OF THE DRAWINGS

The structure, operation and advantages of the presently preferred embodiment of this invention will become further apparent upon consideration of the following description taken in conjunction with the accompanying drawings, wherein:

FIG. 3 is an enlarged cross sectional view of an encircled portion of FIG. 2 identified with the lines 3—3;

FIG. 4 is an enlarged cross sectional view of the suck-back check valve employed in the dispenser devices of FIG. 2, shown in the closed position;

FIG. 5 is an enlarged cross sectional view of the suck-back check valve of FIG. 4 in an open position;

FIG. 6 is an enlarged cross sectional view of the suck-back check valve of FIG. 4 in an initially closed position; and FIG. 7 is an enlarged cross sectional view of the suck-back check valve of FIG. 4 shown moving toward a fully-closed position.

DETAILED DESCRIPTION OF THE INVENTION

For purposes of the present discussion, the method and apparatus of this invention is described in connection with the dispensing of two-component "hot melt" polymeric materials used in adhesive applications. "Hot melt" materials are those materials which are solid at room or ambient temperature but, when heated, are converted to liquid state. It should be understood that the methods and apparatus of this invention are equally applicable for use in connection with the mixing and dispensing of cold materials, such as those materials which are liquid at room or ambient temperature, as well as materials other than adhesives, such as paints, gasket materials and/or caulking materials. This invention may also be used on conjunction with the mixture of two different materials, which are non-reactive.

Figures 1, 1A:
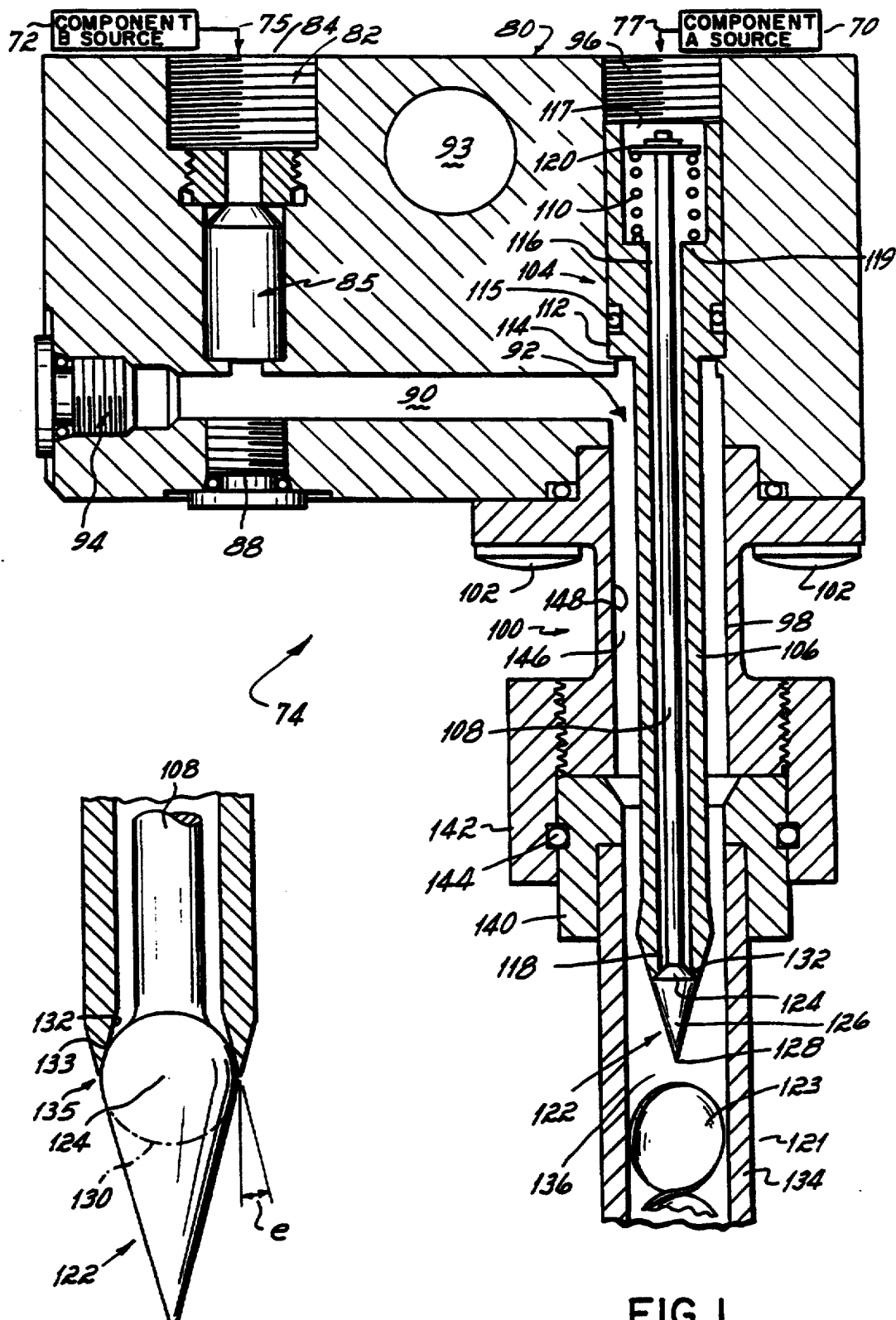
FIG. 1 is an enlarged cross sectional view of one embodiment of a dispenser device including a tapered plunger tip and valve seat.
FIG. 1A is an alternative embodiment of the plunger tip shown in FIG. 1.
Figure 2:
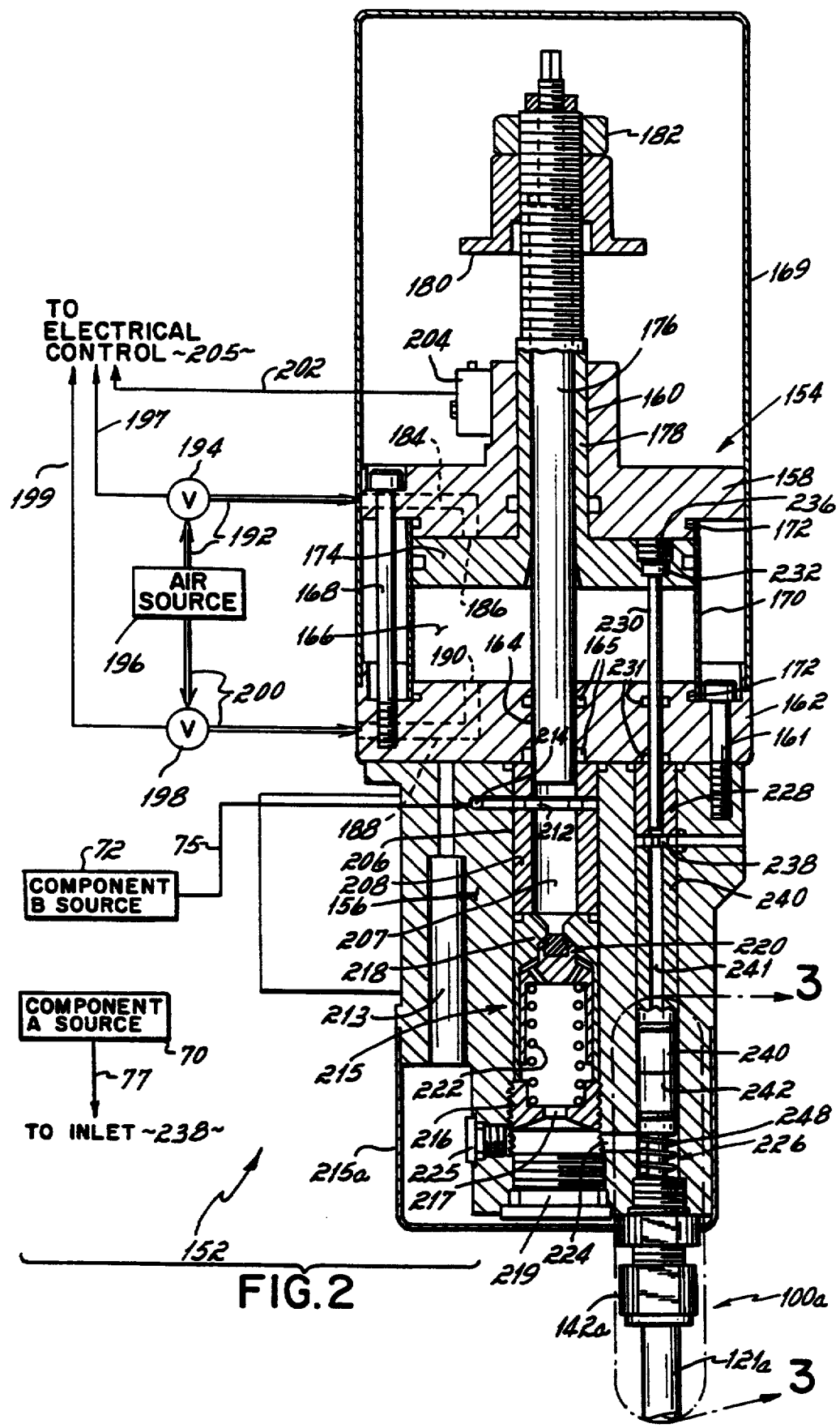
FIG. 2 is a cross sectional view of an alternative embodiment of a dispenser device.

In the embodiments of FIGS. 1 and 2, the "Component A source" 70 includes a hot melt applicator (not shown) which is operative to melt and supply under pressure from a pump contained internally of the applicator a first polymeric material which is utilized in less volume than the other component. Similarly, "Component B source" 72 includes another hot melt applicator (not shown) suitable for melting and supplying under pressure the main or high volume polymeric component utilized in this application. One hot melt applicator suitable for melting and pumping to the system either the Component A or B materials, is the Nordson ® Series 3000 Hot Melt Applicators manufactured by Nordson Corporation. For purposes of this discussion, the lower volume polymeric component, referred to as Component A, can be, for example, a liquid hardener while the higher volume polymeric component referred to herein as Component B, can be a polymeric, hot melt adhesive.

Embodiment of FIGS. 1 and 1A

With reference to FIGS. 1 and 1A, one embodiment of an adhesive dispenser 74 is illustrated. Dispenser 74 comprises a dispenser body 80 formed with a stepped bore 82 having a threaded, inlet end 84 connected through a line 75 to the Component B source 72. The stepped bore 82 mounts a one-way, check valve 85, shown schematically in FIG. 1. The base of stepped bore 82 is closed by a plug 88 immediately beneath a transverse bore 90 which extends from the left side of the dispenser body 80 as viewed in FIG. 1 to a throughbore 92 formed in the dispenser body 80. A plug 94 seals the end of transverse bore 90 opposite the throughbore 92. Preferably, the dispenser body includes a heater 93 depicted schematically in FIG. 1 which maintains a temperature necessary to ensure Components A and B smoothly flow through dispenser 74.

The throughbore 92 has a threaded end 96 which is connected through a line 77 to the Component A source 70. In the presently preferred embodiment, the throughbore 92 continues from the dispenser body 80 into a bore 98 formed in an adapter body 100 mounted to the base of the dispenser body 80 by screws 102. The throughbore 92 of dispenser body 80 and bore 98 of nozzle 100 carry a check valve 104 which comprises a valve body 106, a plunger 108 and a return spring 110. As depicted at the top of FIG. 1, the valve body 106 of check valve 104 has a stepped outer wall forming a flange 112 which rests on a shoulder 114 formed along the throughbore 92 in dispenser body 80. An o-ring 115 is positioned between the valve body 106 and the dispenser body to create a seal thereat. The valve body 106 of check valve 104 is formed with a stepped throughbore 116 having an inlet 117 and a discharge outlet 118 located within the interior of static mixer 121. The stepped throughbore 116 forms a shoulder 119 at its upper end, and the return spring 110 extends between this shoulder 119 and a washer 120 carried at the top of plunger 108.

The plunger 108 of the check valve 104 extends from the top of valve body 106, within its stepped throughbore 116, past the lower end of the valve body 106. The plunger 108 preferably has a plunger tip 122 formed in the general shape of an inverted cone, as viewed in FIG. 1, including a curved or rounded bearing surface 124 and an inwardly tapering, trailing portion 126 which terminates at a point 128. As used herein, the term "inwardly" refers to a direction from the outside surface of the plunger tip 122 toward its central, longitudinal axis, and "outwardly" refers to the opposite direction.

As discussed in detail in U.S. patent application Ser. No. 07/640,043, mentioned above, the component A and B materials begin to chemically react with one another once they are mixed together. Over a period of time, and particularly where the dispenser is operated intermittently, this chemical reaction can form cured or partially cured material which collects on the walls and the mixing element 123 of the mixer 121.

It has been found that by reducing or preventing the formation of dead spots, stagnant areas, etc., in the flow of the mixture, that this will prevent or reduce the formation or accumulation of cured or partially cured mixture therein. This results in an increase in the interval between, and the efficiency of, the purging operations.

It has been found that using a plunger tip 122 having a trailing portion which does not taper inwardly, but is rather flat at its lower portion, will result in the formation of a dead spot which will allow for cured or partially cured mixture to accumulate within the volume substantially defined by the trailing portion 126 of the plunger tip. Once the formation of cured and partially cured material in this region occurs, it will eventually propagate to the side walls of the mixer until purging is required.

It has been found that the tapered, generally conical-shaped configuration of the trailing portion 126 of plunger tip 122 when in its open position induces a smooth flow of the mixture of material past the plunger tip 122 and into the static mixer 121. This configuration of plunger tip 122 substantially prevents the formation of dead spots, gaps or voids in the flow of the mixture as it transitions into the static mixer 121 thus preventing or reducing the formation of the cured material located in the area between the base of check valve 104 and the static mixer 121. The mixture of material is thus smoothly directed into the static mixer 121 and therefore is effective to prevent or reduce the formation of cured or partially cured material within the dispenser or within the immediate area of the plunger tip.

While it is preferred that the plunger tip has an external configuration that will eliminate or reduce the volume of the dead spots in the flow of the mixture, configurations other than that of an inverted cone are within the scope of this invention. For example, in an alternate embodiment, the plunger tip could have a general shape of a ball.

Now with reference also to FIG. 1A, an enlarged view of the plunger tip 122, having a trailing portion in the shape of an inverted cone 126, or the alternative embodiment in the general shape of a ball shown in phantom 130, is illustrated. The bearing surface 124 of plunger tip 122 is engageable with a valve seat 132 formed at the base of the valve body 106. The plunger 108 is movable between the closed position depicted in FIGS. 1 and 1A wherein the bearing surface 124 of plunger tip 122 engages the valve seat 132, and an open position (not shown) wherein the bearing surface 124 and valve seat 132 are disengaged. In the presently preferred embodiment, the surface of valve seat 132 which faces the plunger tip 122 is formed at a slightly included angle $\Theta$ such that in the course of moving to the closed position the plunger tip 122 initially makes essentially point contact with the valve seat 132 and then slides upwardly to the fully seated position shown in FIG. 1. In the course of sliding upwardly, the plunger tip 122 wipes the valve seat 132 substantially clean of the Component A material.

This aides in initially preventing the formation of a cured or partially cured mixture in the area of the plunger tip 122 and valve seat 132 which can plug or restrict flow of the Component A material and/or propagates outwardly toward the walls of the static mixer 121 and restricts the flow of both components into the static mixer 121.

In order to further ensure that a reliable seal is made between the plunger tip 122 and the valve seat 132, it is believed important to generate a seating load to overcome any imperfections between the two surfaces while also maintaining closure even if some Component A material remains trapped therebetween. The seating load SL at the point of contact between the bearing and seating surfaces 133 can be determined from the equation: $SL = ML \div \sin \Theta$. The maximum loading ML is determined by the following equation: $ML = (DP \times B) + SF$; were DP is the differential pressure across the valve when in the closed position, B is the cross sectional area of the bearing surface, and SF is the spring force of the spring 110. Hence, the seating load for a given contact area can be adjusted by adjusting the included angle $\Theta$. Furthermore, the seating load should be determined such that the valve seat will deform slightly to ensure a good seal, but will not over stress the valve seat.

The above seating arrangement is important for high temperature applications, because they preclude the use of polymeric seals. However, in lower temperature applications, a different seating arrangement could be employed which would utilize such polymeric seals.

Also, it is believed to be important to minimize the gap 135 between the bearing surface 124 of the plunger tip and the valve seat 132. This minimizes the area for cured or partially cured material to accumulate and possibly not be removed easily during purging.

In the presently preferred embodiment, the lower portion of check valve body 106, including the plunger tip 122, is carried within the interior of the static mixer 121. This allows the plunger tip 122 and valve seat 132 to be heated during the purging operation as described in patent application Ser. No. 07/640,043. Alternatively, this function could be provided by heating elements carried by the dispenser. The static mixer 121 has a wall 134 forming a hollow interior 136 which carries the spiral-shaped mixing element 123 schematically depicted in FIG. 1. The static mixer 121 is supported by a collar 140 which is retained against the lower end of the nozzle 100 by a nozzle nut 142. As shown in FIG. 1, the nozzle nut 142 is threaded onto a portion of the nozzle 100 and extends into engagement with the collar 140 with a retaining wire 144 preferably interposed therebetween.

The dispenser 74 operates as follows. The Component A material is introduced from the Component A source 70 through line 77 into the bore 98 of dispenser body 80 where it is transmitted into the stepped throughbore 116 of valve body 106. the Component A material flows through the stepped throughbore 116 and contacts the plunger tip 122 with sufficient hydraulic pressure to overcome the spring force exerted by return spring 100 and unseat the plunger tip 122 from the valve seat 132. The Component A material is emitted from the discharge outlet 118 of stepped throughbore 116, past the plunger tip 122, and flows into the static mixer 121. The Component B material is introduced from the Component B source 72 through line 75 into the stepped bore 82 of dispenser body 80. The hydraulic pressure of the Component B material opens the check valve 85, allowing it to enter the transverse bore 90 in dispenser body 80. The Component B material is discharged from the transverse bore 90 into a annular-shaped passageway 146 formed between the outer surface of the valve body 106, and the internal wall 148 collectively formed by the throughbore 92 in the dispenser body 80 and the throughbore 98 in the nozzle 100. The passageway 146 discharges the Component B material into the open end of static mixer 121 and past the bottom portion of the valve body 106 and the plunger tip 122. The Components A and B are then intermixed within the static mixer 121 and discharged from its discharge outlet 25.

Purging Operation

As discussed in detail in U.S. patent application Ser. No. 07/640,043, mentioned above, over a period of time, and particularly where a dispenser is operated intermittently, Components A and B chemically react with one another to form cured or partially cured material which may collect on the walls of mixing element 123 of the mixer 121. In order to prevent a build-up of cured material which could restrict the flow of Component A and B materials, or the mixture thereof through the dispenser, and/or the mixer 121, a purging operation is conducted to remove such cured material. For purposes of the present discussion, the purging operation is accomplished by the stopping the flow of Component A material while the high volume, Component B material is allowed to continue to flow to the static mixer 121. This is achieved by shutting off the flow of Component A material from Component A source 70, while allowing the flow of Component B material from Component B source 72 to continue uninterrupted. The high volume of Component B material is directed from line 75 along the flow paths in the dispenser 74 and then into the static mixer 121.

The configuration of the valve body 106 and plunger tip 122 allows the purging operation to proceed efficiently and without disruption. As viewed in FIG. 1, the Component B material is directed through the annular-shaped passageway 146 formed between the outer surface of the valve body 106, and the internal wall 148 formed by the throughbore 92 in the dispenser body 80 and the throughbore 98 formed in the nozzle 100. With the flow of Component A material terminated, the plunger 108 check valve 104 is in the closed position depicted in FIG. 1 wherein the bearing surface 124 of plunger tip 122 is in engagement with the valve seat 132 at the base of valve body 106.

As during normal operation, the configuration of the plunger tip 122 during purging induces a smooth flow of the Component B material from the outlet of the passageway 146, past the plunger tip 122 and into the static mixer 121. Again, this configuration of plunger tip 122 substantially prevents the formation of dead spots, gaps or voids in the flow of Component B material as it transitions from the passageway 146 into the static mixer 121, thus ensuring that substantially all of the cured material located in the area between the base of check valve 104 and the static mixer 121 is removed. This includes any cured material that may have collected on the plunger tip 122. The Component B material is thus smoothly directed into the static mixer 121 and is effective to carry with it cured or partially cured material formed by the mixture of Components A and B which is discharged from the static mixer 121 prior to the resumption of the flow of Component A material.

Embodiment of FIGS. 2 and 3

Referring now to FIGS. 2 and 3, an alternative embodiment of a dispenser 152 is illustrated. The dispenser 152 is principally intended for applications wherein intermittent shots or doses of two-component material are required without leakage or dripping of material from the static mixer 121A when the flow of material is intermittently interrupted. The dispenser 152 is preferably supplied with Component A material and Component B material from the same source 70, 72 described above in connection with FIG. 1 and 1A.

The dispenser 152 generally comprises a cylinder 154 mounted to a dispenser body 156 which, in turn, carries the static mixer 121A. The cylinder 154 comprises a top plate 158 having a throughbore 160, and a bottom plate 162 formed with a throughbore 164 which is fixed to the dispenser body by screws 161, one of which is shown in FIG. 2. The top and bottom plates 158, 162 are spaced from one another defining a cavity 166 therebetween, and are interconnected by screws 168, one of which is illustrated on the lefthand side of FIG. 2. Preferably, the bottom plate 162 is slotted to receive a cover 169 which substantially encloses the cylinder 154. For purposes of discussion, the term "top" is meant to refer to the upper portion of dispenser 152 as viewed in FIG. 2, and "bottom" refers to the lower portion thereof.

The cavity 166 formed between top and bottom plates 158, 162 is closed by a cylinder wall 170 with an o-ring seal 172 provided at the top and bottom. The cavity 166 receives a piston head 174 which is fixedly mounted to a piston rod 176 extending through a collar 178 of piston head 174, and bore 164 of bottom plate 162. O-rings 165 are preferably interposed between the piston rod 176 and bottom plate 162. The upwardly extending collar 178, which encircles the piston rod 176, carries an actuator 180 which is mounted thereto by a retained nut 182.

The piston head 174 and piston rod 176 are movable as a unit between an upper position depicted in FIG. 2 and a lower position (not shown) wherein the piston head 174 moves to a position adjacent the bottom plate 162 of cylinder 154. In order to obtain such movement, an air passageway 184 is formed in the cylinder top plate 158 having an outlet 186 located above the piston head 174. Similarly, an air passageway 188 is formed in the bottom plate 162 of cylinder 154 having an outlet 190 located beneath the piston head 174. As schematically depicted in FIG. 2, the air passageway 184 is connected by a line 192 carrying a valve 194 to an air source 196, and pressurized air is supplied from air source 196 to the air passageway 188 via a valve 198 and line 200. These valves 194, 198 are each connected to an electrical control 205 schematically down in FIG. 1 by lines 197, 199, respectively. Additionally, a line 202 is connected to the electrical control 205 from a limit switch 204 mounted to the top plate 158 of cylinder 154.

In order to move the piston head 174 and piston rod 176 downwardly, a flow of pressurized air from source 196 is transmitted through line 192 and valve 194 into the air passageway 184 of top plate 158. The pressurized air emitted from the outlet 186 of passageway 184 forces the piston head 174 downwardly within cavity 166 carrying with it the piston rod 176. In order to control the extent of movement of piston head 174 within cavity 166, which, in turn, controls the volume or "dose" of Component A and B materials supplied to the static mixer 121 as discussed below, the actuator 180 and limit switch 204 are positioned relative to one another so that the actuator 180 contacts the limit switch 204 when the piston head 174 has traveled a predetermined axial distance within the cavity 166. Upon such contact, the limit switch 204 sends a signal through line 202 to the electrical control 205 which closes valve 194 to stop the flow of air atop the piston head 174. When it is desired to return the piston head 174 and piston rod 176 to the upper position depicted in FIG. 2, the air within cavity 166 is vented and pressurized air from source 196 is fed through line 200 and valve 198 into the air passageway 188 within the cylinder bottom plate 162. The pressurized air entering the cavity 166 beneath the piston head 174 moves it to the upper position.

The upward and downward movement of the piston head 174 and piston rod 176 is effective to force metered quantities of Component A material and Component B material through the dispenser body 156 and into the static mixer 121. With reference to the bottom portion of FIG. 2, the dispenser body is formed with a throughbore 206 in alignment with the piston rod 176. The lower potion of the piston rod 176 extends into the central throughbore 207 of a guide bushing 208 carried at the top of throughbore 206. This guide bushing 208 has a series of circumferentially spaced radial ports 212 which connect to an inlet 214 formed in the dispenser body 156. This inlet 214, in turn, is connected via line 77 to the Component B source 72. A heater 213 is preferably mounted to the dispenser body 156 beside throughbore 206, and this heater 213 is accessible by removing a cover 215a at the base of dispenser body 156.

A suck-back check valve 215 is carried within the throughbore 206 between the guide bushing 208 and a retainer 216 having a throughbore 217. The retainer 216 may be for example, threaded upwardly into throughbore 206 from the base of dispenser body 156 until it engages the check valve 215, thus retaining the check valve 215 guide bushing 208 in position within the throughbore 206. The bottom of throughbore 206 is closed by a plug 219. The suck-back check valve 215 generally comprises a valve seat 218, a valve plug 220 and at least one return spring 222 extending between the retainer 216 and valve plug 220. The detailed construction and operation of suck-back check valve 215 is described below.

The dispenser body 156 is formed with a transverse bore 224 which intersects the throughbore 206 and connects to a smaller diameter, stepped throughbore 226 formed in the dispenser body 156 on the righthand side of FIG. 2. The end of transverse bore 224 opposite throughbore 226 is closed by a plug 225. The stepped throughbore 226 forms a flow path for the Component A material into the static mixer 121 for combination with the Component B material supplied from the throughbore 206 and transverse bore 224.

Referring to the middle of FIG. 2, the upper portion of stepped throughbore 226 mounts an upper bushing 228 formed with a throughbore which receives one end of a piston 230. The piston 230 extends from a bore formed in the bottom plate 162 of cylinder 154, with o-rings 231 therebetween, through the cavity 166 of cylinder 154 and into the piston head 174 where an enlarged end 232 of the piston 230 is confined within a recess therein by a threaded stud 236. With the piston head 174 in an upper position depicted in FIG. 2, the lowermost end of piston 230 extends into the upper bushing 228 immediately above a Component A inlet 238 formed in dispenser body 156 which is connected to the line 30 carrying Component A material. See FIG. 1. A lower bushing 240 formed with a bore 241 extends downwardly from the inlet 238, and its lowermost end contacts a spring seat 242 carried within the stepped throughbore 226. See also FIG. 3. The spring seat 242 is held in position against the lower bushing 240 by a seat retainer spring 248 which rests atop a nozzle 100a similar to the type shown in FIG. 1 and discussed above. Alternatively, the spring may be replaced with a spacer.

With reference to FIG. 3, the bottom end of bushing 240 and the top end of spring seat 242 are each recessed and collectively form a cavity 246. This cavity 246 receives the top end of a check valve 104a similar to valve 104 shown in FIG. 1 and described in detail above. In fact, the remaining portion of dispenser 152, including the nozzle 100a and check valve 104a are identical in function while being slightly different in structure to that described in FIG. 1. Structure which is common to both Figures is identified with the same reference numbers, except the FIG. 3 numerals have a suffix "a", and is not discussed separately here.

The operation of dispenser 152 is as follows. Component A material is introduced from the Component A source 70 through line 77 into the inlet 238 formed in the dispenser body 156. The Component A material fills the throughbore 241 of lower bushing 240 and then enters the cavity 246 formed between the lower bushing 240 and spring seat 242. At the same time, Component B material is introduced from the Component B source 72 through line 75 into the inlet 214 and ports 212 associated with guide bushing 208. The central bore 207 of guide bushing 208 is filled with the Component B material upstream from the valve seat 218 of check valve 215.

Assuming that the dispenser 152 has already been primed, i.e., Component A and B material have been introduced to the dispenser 152 and fill the lines leading from the inlets 212 and 238 to and including the static mixer 121, the electrical controller 205 is operative to open valve 194 so that pressurized air is transmitted through line 192 to the air passageway 184 in the top plate 158 of cylinder 154. In response to the force exerted by the pressurized air, the piston head 174 and piston rod 176, as well as the piston 230, are moved downwardly with respect to the dispenser body 156. The Component B material within the central bore 207 of guide bushing 208 is forced downwardly by the piston rod 176 to open the check valve 215. A slug or dose of Component B material of predetermined volume flows from the bushing bore 207 into the transverse bore 224 thus forcing the Component B ahead of it, i.e., within the passageway 146a, past the bottom portion of valve body 106a of check valve 104a and into the static mixer 121a. Simultaneously, a predetermined quantity of the Component A material contained within the throughbore 241 of bushing 240 is forced downwardly by piston 230 to open the check valve 104a. The Component A material within the stepped throughbore 116 of check valve body 106a flows out the discharge outlet of throughbore 116a, past the plunger tip 122a, and combines with the Component B material within the static mixer 121a. As mentioned above, the desired quantity or volume of the Component A and B materials supplied is controlled by the extent of downward movement of piston head 174 within cavity 166, which, in turn, controls the extent of downward movement of piston rod 176 and piston 230. With the piston head 174 in its lowered position, the piston rod 176 and piston 230 block the flow of material into their associated inlets 212, 238, respectively. Once the downward stroke of piston head 174 and piston rod 176 is completed, the electrical control 205 is operative to reverse the flow of air within the cylinder cavity 166, as described above, and force the piston head 174, piston rod 176 and piston 230 upwardly to the position shown in FIG. 2. When the piston head has returned to its FIG. 2 position, the flow of Component A and B material into the dispenser body 156 is allowed to resume to fill the central bore 207 of guide bushing 208 and the throughbore 241 of bushing 240 in preparation for another stroke of the piston head 174.

Purging of the dispenser would be similar to that described for the dispenser 74 by stopping the flow of the Component A material and purging with the Component B material or some other purging material as required.

Suck-Back Check Valve

One important aspect of this invention involves the operation of the suck-back check valve 215 in preventing leakage or drooling of the mixture of Components A and B from the static mixer 121a when the flow of such components within the dispenser 152 is intermittently interrupted. With reference to FIGS. 4–7, the suck-back check valve 215 is illustrated in more detail.

The valve seat 218 of check valve 215 includes an upper cavity 250 and a lower cavity 252 connected by a bore 254. The upper portion of the lower cavity 252 defines a seat including a radially inwardly tapering portion 256 and a generally cylindrical-shaped wall portion 258. The remainder of lower cavity 252 is defined by a cylindrical-shaped skirt 260, which, in the embodiment of FIG. 2, has a bottom end which rests upon the retainer 216. The top end of valve seat 218 rests against the guide bushing 208 with an o-ring 253 positioned therebetween.

The valve plug 220 of check valve 215 includes an extension 262 having a top surface 263 which mates with the tapered portion 256 of valve seat 218, and a side wall 265 which is slidable along the cylindrical wall portion 258 of the valve seat 218. An insert 264 may be carried at the top of the extension 262 for retaining an o-ring 266 which is engageable with the tapered portion 256 of valve seat 218. A number of radially inwardly extending ports 268 are formed in the valve plug 220 which extend at an angle between the extension 262 and a cylindrical wall 270 forming a cavity 271 at the bottom portion of valve plug 220. The ports 268 provide a means for self purging entrapped air therein so as not to reduce the vacuum that is produced during operation as discussed further below. The cylindrical wall 270 of valve plug 220 is slidable along the inner surface of the skirt 260 of valve seat 218. Preferably, the return spring 222 of check valve 215 is captured within the cylindrical wall 270 of valve plug 220 and rests on the retainer 216.

In response to the flow of Component B material through the central bore 207 in guide bushing 208 of the dispenser 152, the valve plug 220 is moved from the closed position depicted in FIG. 4 to an open position depicted in FIG. 5. That is, the hydraulic force of the Component B material overcomes the spring force exerted by the return spring 222 which tends to move the valve plug 220 to the closed position and unseats the valve plug 220 from the valve seat 218. The Component B material flows from the upper cavity 250 of valve seat 218, through the bore 254 and into the lower cavity 252 thereof. From the top portion of lower cavity 252, the Component B material passes over the extension 262 of valve plug 220, enters its radial ports 268 and then flows into the cavity 271 as depicted by the arrows in FIG. 5. The flow of Component B material continues from the cavity 271 through the port 217 in retainer 216 and then enters the transverse bore 224 in the dispenser body 256 of dispenser 152.

The valve plug 220 remains in an unseated, open position as long as the Component B material is directed therepast. In the operation of the intermittent dispenser 152, the Component B material is delivered past valve plug 220 only until such time as the quantity of component B material within central bore 207 of guide bushing 208 is pushed therefrom by the piston rod 176. When the flow of Component B material is stopped, a closing sequence of valve plug 220 is initiated which develops a suction in the passageways downstream therefrom to aid in retaining the mixture of Components A and B within the static mixer 121a.

With reference to FIGS. 6 and 7, once the downward flow of Component B material through valve seat 218 is terminated, the return spring 222 attempts to force the valve plug 220 to its closed position with respect to valve seat 218. Such closure must proceed in stages, because at least some quantity of Component B material is present between the upper portion of the lower cavity 252 of valve seat 218 and the extension 262 of valve plug 220, as well as within the upper cavity 250 of valve seat 218 and the area upstream therefrom. In the embodiment of FIG. 2, the pressure within the valve seat 218 and in the central bore 207 of guide bushing 208 is relieved by the upward movement of the piston rod 176 out of the guide bushing 208. As viewed in FIG. 6, the uppermost edge of the side wall 265 of extension 262 initially contacts the cylindrical wall portion 258 of valve seat 218 to provide a first point of sealing, but is prevented from fully seating within the valve seat 218 because of the presence of Component B material within the lower cavity 252. As further pressure is relieved upstream from the valve seat 218, by continued movement of the piston rod 176 to its upper position, the remaining volume of Component B material within the lower cavity 252 is forced into the upper cavity 250 of valve seat 218 allowing the o-ring 266 to provide another point of sealing which allows the valve plug 220 to fully seat against the valve seat 218. In the course of moving from the position shown in FIG. 6 to its fully seated position, the valve plug 220 creates a suction in the passages downstream therefrom, i.e., bores 224 and 146a in dispenser 152, which is effective to substantially prevent the leakage or drooling of the mixture of Component A and B material within a static mixer 121a. This is particularly advantageous in the embodiment of the dispenser 152 shown in FIG. 2 which, as mentioned above, is intermittent in operation.

While the invention has been described with reference to a preferred embodiment, it should be understood by those skilled in the art that variations may be made and equivalents may be substituted for elements thereof without departing from the scope of the invention. In addition, many modifications may be made to adapt a particular situation or material to the teachings of the invention without departing from the essential scope thereof.

For example, while the operation of dispensers 74 and 152 is discussed in connection with combining Components A and B at different volume, it should be understood that equal volumes of such components could be combined depending on the type of mixture required for a particular application.

Therefore, it is intended that the invention not be limited to the particular embodiment disclosed as the best mode contemplated for carrying out this invention, but that the invention will include all embodiments falling within the scope of the appended claims.

It is claimed:

1. A dispensing apparatus comprising:
   a dispenser body;
   said dispenser body being formed with a first passageway having an inlet adapted to connect to a source of a first material, and a first discharge outlet, a second passageway having an inlet adapted to connect to a source of a second material, and a second discharge outlet;
   a valve located at said first discharge outlet of said first passageway and at least a portion of said valve being located in the path of the second material emitted from said second discharge outlet so that the second material flows past said first discharge outlet and combines with the first component emitted from said first discharge outlet prior to discharge from said dispenser body,
   wherein said valve comprises a valve seat located at said first discharge outlet of said first passageway and a plunger having a plunger tip movable between an open and closed position relative to said valve seat, at least one of said valve seat and plunger tip being located in the path of the second material emitted from said second discharge outlets,
   wherein said plunger tip has an external configuration such that in the open position, a mixture of the first and second materials smoothly flows therepast without substantially inducing dead spots in said flow; and in the closed position, the flow of material from the second discharge outlet is likewise smoothly directed therepast; and
   wherein said valve seat includes a radial inwardly tapering surface and in which plunger tip is spherical-shaped including a rounded bearing surface engageable with said radially inwardly tapering surface of said valve seat.

2. The apparatus of claim 1 wherein in the course of moving from the open to-the closed position, the plunger tip slidably moves along the valve seat to substantially wipe away any entrapped material there between before becoming fully seated.

3. The apparatus of claim 1 wherein one of said valve seats and said plunger tip has an external configuration such that upon movement of said plunger tip to said closed position, flow of material discharged from the second discharge outlet past said valve seat and plunger tip is effective to substantially remove the first material, or a mixture of the first and second materials.

4. The apparatus of claim 1 further including mixing means, communicating with said first and second discharge outlets, for intermixing the first and second components to form a mixture.

5. The apparatus of claim 1 in which said dispenser body is formed with a bore defining an internal wall, said bore receiving a valve body having an outer wall and a throughbore which forms said first passageway, said outer wall of said valve body being spaced from said internal wall of said bore in said dispenser body to define said second passageway therebetween.

6. The apparatus of claim 5 in which said valve body has an outlet end formed with said valve seat, said plunger of said valve being carried within said throughbore of said valve body so that said plunger tip is located exteriorly of said valve body in position to engage said valve seat.

7. The apparatus of claim 6 in which said valve seat is formed with a radially inwardly tapering surface, said plunger tip being formed with a rounded bearing surface engageable with said inwardly tapering surface of said valve seat and an elongated, trailing portion which tapers radially inwardly from said rounded bearing surface.

8. An apparatus for dispensing a flowable material, comprising:
   a dispenser body, said dispenser body being formed with a first passageway having an inlet adapted to connect to a source of a first component;
   a dispenser discharge outlet for dispensing flowable material from the dispenser body;

a means for at least partially releasing pressure within said first passageway when the supply of the first component is terminated;

a valve seat carried within said first passageway, said valve seat being formed with an inlet cavity connected to said means, and an outlet cavity connected to said inlet cavity, said outlet cavity forming a bearing surface including a radially inwardly tapering portion closest to said inlet cavity and a wall portion connected to said tapering portion;

a valve plug having an extension formed with a tapered end which mates with said radially inwardly tapering portion of said valve seat and a slide wall which is slidable along said wall portion of said valve seat, said valve plug being moveable within said outlet cavity of said valve seat between an open position wherein said extension of said valve plug disengages said valve seat and a closed position wherein said tapered end of said extension contacts said radially inwardly tapering portion of said bearing surface of said valve seat;

biasing means carried within said first passageway for urging said valve plug in a direction toward said inlet cavity of said valve seat, whereby in response to the supply of pressurization flowable material into said first passageway, said valve plug moves to said open position, and in response to a release of pressure within said first passageway upstream from said valve seat said valve plug initially moves to a partially seated position wherein at least a portion of said side wall of said valve plug contacts said wall portion of valve seat and a quantity of flowable material remains within said inlet cavity and outlet cavity and said first passageway upstream from said valve seat, said biasing means thereafter urging said valve plug to said closed position as the flowable material exits said outlet cavity of said valve seat, said valve plug creating a suction within said first passageway downstream therefrom in the course of moving from said open position to said closed position which is effective to substantially prevent leakage of flowable material from the dispenser discharge outlet.

9. The apparatus of claim 8 wherein said dispenser body further includes a second passageway having an inlet adapted to connect to a source of a second component material; the first and second passageways each having a discharge outlet in communication with the dispenser discharge outlet; and wherein the flowable material includes both the first and second components.

10. The apparatus of claim 9 in which said means includes a pumping system comprising:
a cylinder having an interior, said cylinder being connected to said dispenser body;
a piston head movable within said cylinder;
a piston rod connected to said piston head, said piston rod being movable within said first passageway of said dispenser body in a first direction toward said valve seat and in a second direction away from said valve seat, said piston rod forcing the first component under pressure through said valve seat in the course of movement in said first direction to move said valve plug to said open position, said piston rod at least partially releasing pressure within said first passageway upstream from said valve seat in the course of moving to said second direction to permit said valve plug to move to said closed position.

11. The apparatus of claim 10 in which said pumping system includes a second piston connected to said piston head, said second piston being movable within said second passageway of said dispenser body in a first direction to force the second component within said second passageway to said discharge outlet thereof, and in a second direction opposite said first direction.

12. The apparatus of claim 9 further comprising:
mixing means, communicating with said dispenser discharge outlet, for intermixing the first and second components to form a mixture and wherein the movement from said open to said closed position of said valve plug is effective to substantially prevent leakage of the mixture from a discharge outlet of the mixing means.

13. The apparatus of claim 9 in which said extension of said valve plug mounts an insert, said insert carrying an elastomeric seal in position to engage said radially inwardly tapering portion of said valve seat.

14. The apparatus of claim 9 in which said valve plug is formed of a cylindrical-shaped wall defining a cavity, and a plurality of ports extending between said lower cavity of said valve seat and said cavity of said valve plug.

15. The apparatus of claim 9 in which said biasing means is a spring located within said cavity of said valve plug.

16. The apparatus of claim 9 further comprising:
a second check valve including a valve seat located at said second discharge outlet of said second passageway and a plunger having a plunger tip movable between an open and closed position relative to said valve seat, at least one of said valve seat and plunger tip being located in the path of the first material emitted from said first discharge outlet so that the first and second materials come into contact with one another and at least begin to form a mixture thereat, one of said valve seat and said plunger tip having an external configuration such that upon movement of said plunger tip to said closed position a flow of material past said valve seat and plunger tip is effective to substantially remove the mixture.

17. The apparatus of claim 11 further comprising:
a second check valve including a valve seat located at said second discharge outlet of said second passageway and a plunger having a plunger tip movable between an open and closed position relative to said valve seat, at least one of said valve seat and plunger tip being located in the path of the first material emitted from said first discharge outlet so that the first and second materials come into contact with one another and at least begin to form a mixture thereat, one of said valve seat and said plunger tip having an external configuration such that upon movement of said plunger tip to said closed position a flow of material past said valve seat and plunger tip is effective to substantially remove the mixture.

18. The apparatus of claim 17 in which said dispenser body is formed with a bore defining an internal wall, said bore receiving a valve body of said second check valve having an outer wall and a throughbore which forms said second passageway, said outer wall of said valve body of said second check valve being spaced from said internal wall of said bore in said dispenser body to define said first passageway therebetween.

19. The apparatus of claim 18 in which said valve body has an outlet end formed with said valve seat, said plunger of said second check valve being carried within said throughbore of said valve body so that said plunger tip is located exteriorly of said valve body in position to engage said valve seat; and said valve seat is formed with a radially inwardly tapering surface, said plunger tip being formed with a rounded bearing surface engageable with said inwardly tapering surface of said valve seat and an elongated, trailing portion which tapers radially inwardly from said rounded bearing surface.

20. A method of dispensing a mixture of polymeric material comprising the steps of:

a) actuating a check valve, carried at the discharge outlet of a first passageway formed within a dispenser, to an open position;

b) directing the flow of a first material through the first passageway and said check valve while directing the flow of a second material through a second passageway formed within the dispenser;

c) smoothly directing the flow of both materials over at least a portion of the check valve; and d) discharging the resultant mixture from the dispenser; and wherein the step of directing the flow of the second component through the second passageway includes causing a check valve carried within the second passageway to move to an open position; and further comprising the step of selectively terminating the flow of each of the first and second components while simultaneously creating a suction within the second passageway and the dispenser by permitting the check valve of the second passageway to move from the open position to a closed position, wherein the escape of said mixture is substantially prevented.

21. The method of claim 20 further comprising the steps of terminating the flow of the first material by moving the check valve to a closed position; and directing a flow of material from the second passageway past at least a portion of the outer surface of the check valve to substantially remove the mixture of the first and second components from the dispenser.

* * * * *